US011272565B2

(12) United States Patent
Basu Mallick et al.

(10) Patent No.: US 11,272,565 B2
(45) Date of Patent: Mar. 8, 2022

(54) CONFIGURATION INFORMATION FOR AN INACTIVE STATE

(71) Applicant: Motorola Mobility LLC, Chicago, IL (US)

(72) Inventors: Prateek Basu Mallick, Dreieich (DE); Ravi Kuchibhotla, Clarendon Hills, IL (US); Joachim Loehr, Wiesbaden (DE)

(73) Assignee: Motorola Mobility LLC, Chicago, IL (US)

( * ) Notice: Subject to any disclaimer, the term of this patent is extended or adjusted under 35 U.S.C. 154(b) by 99 days.

(21) Appl. No.: 16/681,680

(22) Filed: Nov. 12, 2019

(65) Prior Publication Data
US 2020/0084824 A1 Mar. 12, 2020

Related U.S. Application Data

(63) Continuation of application No. 15/497,657, filed on Apr. 26, 2017, now Pat. No. 10,499,448.
(Continued)

(51) Int. Cl.
*H04W 76/27* (2018.01)
*H04W 56/00* (2009.01)
(Continued)

(52) U.S. Cl.
CPC ......... *H04W 76/27* (2018.02); *H04W 56/001* (2013.01); *H04W 56/0015* (2013.01);
(Continued)

(58) Field of Classification Search
CPC ........... H04W 76/046; H04W 28/0278; H04W 72/1247; H04W 72/10; H04W 56/001
See application file for complete search history.

(56) References Cited

U.S. PATENT DOCUMENTS

2001/0031634 A1* 10/2001 Mizutani ............... H04W 72/10
455/425
2005/0226274 A1 10/2005 Kwon et al.
(Continued)

FOREIGN PATENT DOCUMENTS

EP 2509345 A1 10/2012
WO 2013177337 A1 11/2013

OTHER PUBLICATIONS

Qualcomm Incorporated, "Common Iu/S1 for Connectionless Data Transmission", SA WG2 Meeting #95, S2-130328, Jan. 28-Feb. 1, 2013, pp. 1-10.
(Continued)

*Primary Examiner* — Jamal Javaid
(74) *Attorney, Agent, or Firm* — Kunzler Bean & Adamson

(57) ABSTRACT

Apparatuses, methods, and systems are disclosed for transmitting and/or receiving configuration information for an inactive state. One method includes receiving configuration information for a radio bearer. The method includes transitioning the radio bearer to an inactive state and configuring the radio bearer based on the configuration information. The configuration information configures the radio bearer with: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and/or a fourth configuration that inhibits data transmission in the inactive state and inhibits initiating transition from the inactive state to the connected state.

11 Claims, 14 Drawing Sheets

Related U.S. Application Data

(60) Provisional application No. 62/454,397, filed on Feb. 3, 2017.

(51) Int. Cl.
*H04W 72/10* (2009.01)
*H04W 72/12* (2009.01)
*H04W 72/04* (2009.01)
*H04W 28/02* (2009.01)

(52) U.S. Cl.
CPC ....... *H04W 72/0413* (2013.01); *H04W 72/10* (2013.01); *H04W 72/1247* (2013.01); *H04W 28/0278* (2013.01); *H04W 72/1242* (2013.01)

(56) References Cited

U.S. PATENT DOCUMENTS

| | | |
|---|---|---|
| 2009/0080380 A1 | 3/2009 | Chun et al. |
| 2009/0088195 A1 | 4/2009 | Rosa et al. |
| 2009/0113086 A1 | 4/2009 | Wu et al. |
| 2009/0316637 A1 | 12/2009 | Yi et al. |
| 2011/0130099 A1 | 6/2011 | Madan et al. |
| 2012/0281566 A1 | 11/2012 | Pelletier et al. |
| 2013/0010738 A1 | 1/2013 | Marchand et al. |
| 2013/0044699 A1 | 2/2013 | Eriksson |
| 2013/0094482 A1 | 4/2013 | Kim et al. |
| 2013/0114446 A1* | 5/2013 | Liu ....................... H04W 24/10 370/252 |
| 2013/0170453 A1 | 7/2013 | Kim et al. |
| 2013/0301568 A1 | 11/2013 | Park et al. |
| 2014/0016614 A1 | 1/2014 | Velev et al. |
| 2014/0056243 A1 | 2/2014 | Pelletier et al. |
| 2014/0242962 A1 | 8/2014 | Choi et al. |
| 2014/0349694 A1* | 11/2014 | Raghothaman ....... H04W 76/25 455/509 |
| 2015/0230248 A1 | 8/2015 | Kim et al. |
| 2015/0373733 A1 | 12/2015 | Bangolae et al. |
| 2017/0332385 A1 | 11/2017 | Shirali et al. |
| 2018/0027443 A1 | 1/2018 | Lee et al. |
| 2018/0054755 A1 | 2/2018 | Lee et al. |
| 2018/0139646 A1 | 5/2018 | Basu Mallick et al. |
| 2018/0227962 A1 | 8/2018 | Mallick et al. |

OTHER PUBLICATIONS

International Searching Authority, PCT/US2018/016921, "Notification of Transmittal of the International Search Report and the Written Opinion of the International Searching Authority, or the Declaration", May 4, 2018, pp. 1-12.

* cited by examiner

CONFIGURATION INFORMATION FOR AN INACTIVE STATE

CROSS-REFERENCE TO RELATED APPLICATIONS

This application is a division of application Ser. No. 15/497,657 filed on Apr. 26, 2017, which claims priority to U.S. Patent Application Ser. No. 62/454,397 entitled "EFFICIENT DATA TRANSMISSION IN INACTIVE RRC STATE 5G WIRELESS COMMUNICATION" and filed on Feb. 3, 2017 for Prateek Basu Mallick, all of which are incorporated herein by reference in their entirety.

FIELD

The subject matter disclosed herein relates generally to wireless communications and more particularly relates to configuration information for an inactive state.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a UE may be in an inactive state in which it may transmit a certain amount of data without transitioning to a connected state. In such networks, an amount of data allowable to be transmitted by the UE in the inactive state may be fixed. However, in some environments, using a fixed amount of data may result in excessive transitions between the inactive state and the connected state and/or too few transitions between the inactive state and the connected state.

BRIEF SUMMARY

Apparatuses for transmitting and/or receiving configuration information for an inactive state are disclosed. Methods and systems also perform the functions of the apparatus. In one embodiment, a method includes receiving configuration information for a radio bearer. In various embodiments, the method includes transitioning the radio bearer to an inactive state after receiving the configuration information. In certain embodiments, the method includes configuring the radio bearer based on the configuration information in response to transitioning the radio bearer to the inactive state. In some embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state.

In one embodiment, the data property includes a data size, a buffer occupancy level, or some combination thereof. In a further embodiment, receiving the configuration information includes receiving the configuration information with a message directing the radio bearer to transition to the inactive state.

In some embodiments, a method includes determining configuration information for a radio bearer of a remote unit. In various embodiments, the method includes transmitting the configuration information to the remote unit. In certain embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state.

A method for a remote unit in an inactive state includes preparing data for transmission. The method also includes determining that additional data is to be available for transmission within a predetermined period of time. The method includes receiving a data threshold parameter that is applied while the remote unit is in the inactive state. The method also includes transmitting the data with an indication selected from the group including: a first indication indicating that the additional data is available to be transmitted and a data size of the additional data is less than the data threshold parameter; and a second indication indicating that the additional data is available to be transmitted and the data size of the additional data is greater than the data threshold parameter.

In one embodiment, the method includes determining anticipated data unavailable in a layer 2 transmission buffer based on interaction between layer 2 access stratum protocols, non-access stratum, an application layer, layers higher than layer 2, or some combination thereof. In various embodiments, the method includes comparing a buffer occupancy of the anticipated data with the data threshold parameter. In certain embodiments, the indication includes information indicating a result of the comparison between the buffer occupancy of the anticipated data and the data threshold parameter. In some embodiments, the information includes a one bit flag having a status selected from the group including: a first status indicating that a size of the anticipated data is greater than the data threshold parameter; and a second status indicating that the size of the anticipated data is less than the data threshold parameter. In one embodiment, the indication is transmitted using a resource selected from the group including: a medium access control element having its own logical channel identification; a medium access control protocol data unit header format; and a remote unit identification.

In various embodiments, the remote unit includes state indication information that indicates whether the remote unit is in the inactive state or a connected state. In certain embodiments, the method includes transmitting the state indication information using a resource selected from the group including: a medium access control element having its own logical channel identification; a medium access control protocol data unit header format; a transport channel and/or a physical channel; predetermined physical resources for transmitting while in the inactive state; a predetermined format for transmitting while in the inactive state; and a predetermined preamble for transmitting while in the inactive state.

In certain embodiments, a method includes transmitting a message to a remote unit. In such embodiments, the message may include an indication selected from the group including: a first indication indicating that a data size is to be calculated using data of radio bearers that are not suspended and are allowed to transmit data in an inactive state; and a second indication indicating that the data size is to be calculated using data of radio bearers specified as part of the second indication. In one embodiment, the message is transmitted using a resource selected from the group including: radio resource control signaling; and lower layer signaling.

In some embodiments, a method includes transmitting configuration information to a remote unit. In such embodiments, the configuration information may include a data threshold to be applied to a radio bearer in an inactive state. The method also includes receiving an indication from the remote unit. In various embodiments, the indication is selected from the group including: a first indication indicating that the remote unit has data for the radio bearer having a size that is less than the data threshold; and a second indication indicating that the remote unit has data for the radio bearer having a size that is greater than the data threshold.

In various embodiments, the method includes transmitting a message to the remote unit, the message including instructions for the remote unit to perform: initiating uplink synchronization based on a timing alignment if the timing alignment is included in the message; processing an uplink grant if the uplink grant is included in the message; transmitting data; transmitting a buffer status report; transmitting information initiating transition to a connected state; or some combination thereof. In some embodiments, the message is transmitted using a resource selected from the group including: radio resource control signaling; a lower layer medium access control element; and physical layer signaling.

In some embodiments, a method includes receiving an indication from a remote unit. In various embodiments, the indication is selected from the group including: a first indication indicating that the remote unit has data for the radio bearer having a size that is less than the data threshold; and a second indication indicating that the remote unit has data for the radio bearer having a size that is greater than the data threshold. The method also includes determining, based on the indication from the remote unit, to: transmit a message to the remote unit indicating for the remote unit to transition to a connected state; initiate uplink synchronization by transmitting a timing alignment to the remote unit; provide an uplink grant on a control channel; transmit a request to the remote unit to include a buffer status report in its next uplink transmission; or some combination thereof. In certain embodiments, the message is transmitted using a radio resource control signaling or lower layer signaling.

In various embodiments, a method includes transmitting a message to a remote unit. In some embodiments, the message includes information used to configure a logical prioritization order of the remote unit, and the information indicates an order of priority for a buffer status report, data, and radio resource control signaling. In some embodiments, the message is transmitted using a resource selected from the group including: radio resource control signaling; a lower layer medium access control element; and physical layer signaling.

In one embodiment, a method includes receiving a message. In certain embodiments, the message includes information used to configure a logical prioritization order, and the information indicates an order of priority for a buffer status report, data, and radio resource control signaling. The method also includes configuring the logical prioritization order based on the information. The method includes performing transmissions based on the logical prioritization order.

In certain embodiments, a method includes receiving a first message. In various embodiments, the first message includes information indicating to initiate transition to a connected state. The method also includes prioritizing data transmission based on a grant received with the first message. In some embodiments, the data transmission is prioritized by assigning a highest priority to a second message used to initiate transition to the connected state, assigning a second highest priority to a buffer status report, and assigning a third highest priority to data to be transmitted. In some embodiments, the data is transmitted with the second message in response to there being sufficient space as part of the grant.

In various embodiments, a method includes determining a trigger condition that indicates that a remote unit is to transition from an inactive state to a connected state. In certain embodiments, the trigger condition includes the remote unit making a predetermined number of transmissions in the inactive state within a predetermined time period. The method also includes transmitting information indicating the trigger condition to the remote unit. In some embodiments, the predetermined number of transmissions includes an amount of data greater than a predetermined threshold.

In various embodiments, a method includes receiving information indicating a trigger condition to transition from an inactive state to a connected state. In some embodiments, the trigger condition includes making a predetermined number of transmissions in the inactive state within a predetermined time period. The method also includes determining whether the trigger condition is satisfied. The method includes, in response to the trigger condition being satisfied, initiating a transition from the inactive state to the connected state. In one embodiment, initiating the transition from the inactive state to the connected state includes using a resume procedure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
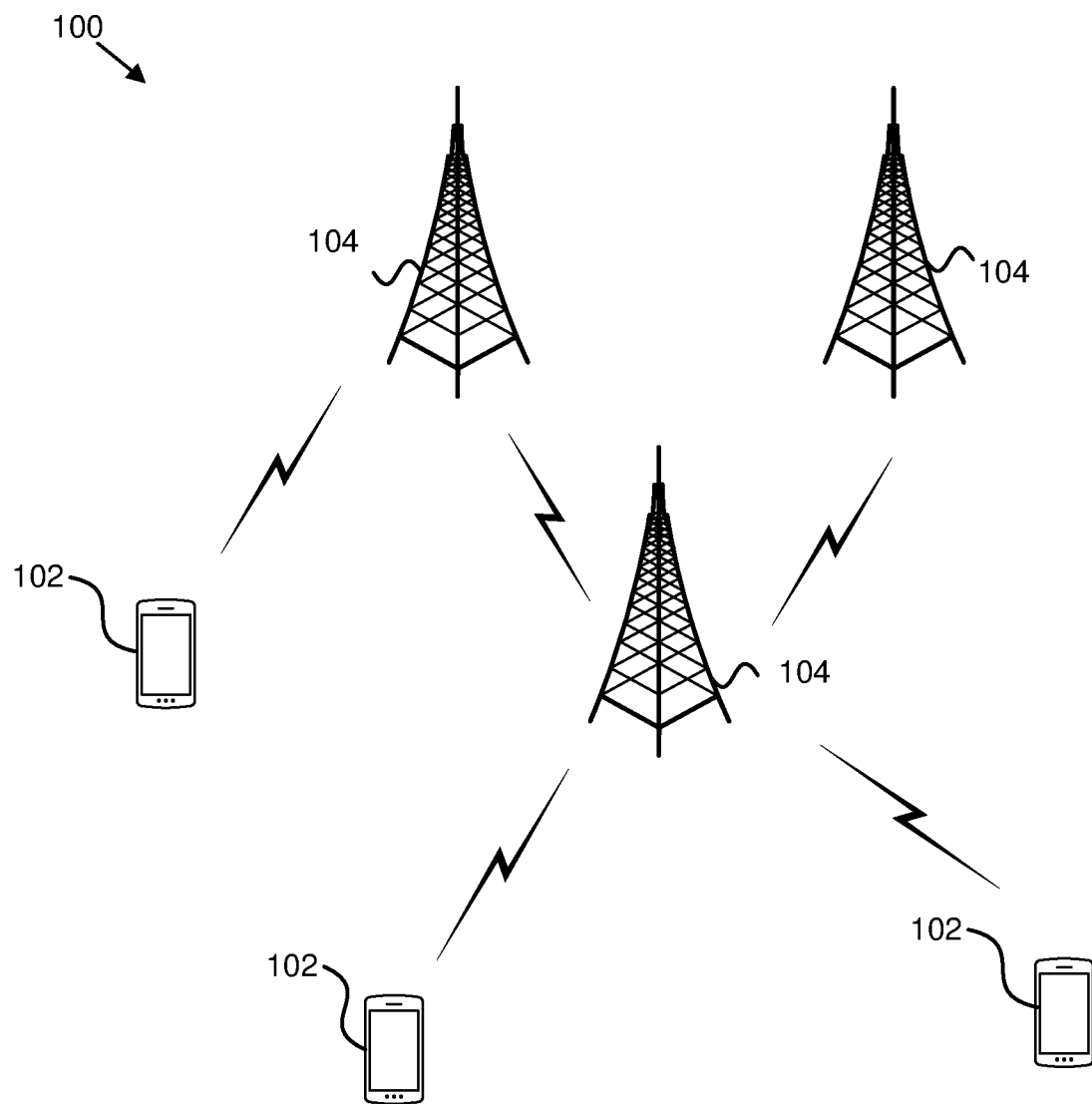
FIG. 1 is a schematic block diagram illustrating one embodiment of a wireless communication system for transmitting and/or receiving configuration information for an inactive state.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving configuration information for an inactive state. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may determine configuration information for a radio bearer of a remote unit 102. In various embodiments, the base unit 104 may transmit the configuration information to the remote unit 102. In certain embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state. Accordingly, a base unit 104 may be used for transmitting configuration information for an inactive state.

In another embodiment, a remote unit 102 may receive configuration information for a radio bearer from a base unit 104. In various embodiments, the remote unit 102 may transition the radio bearer to an inactive state after receiving the configuration information. In certain embodiments, the remote unit 102 configures the radio bearer based on the configuration information in response to transitioning the radio bearer to the inactive state. In some embodiments, configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state. Accordingly, a remote unit 102 may be used for receiving configuration information for an inactive state.

Figure 2:
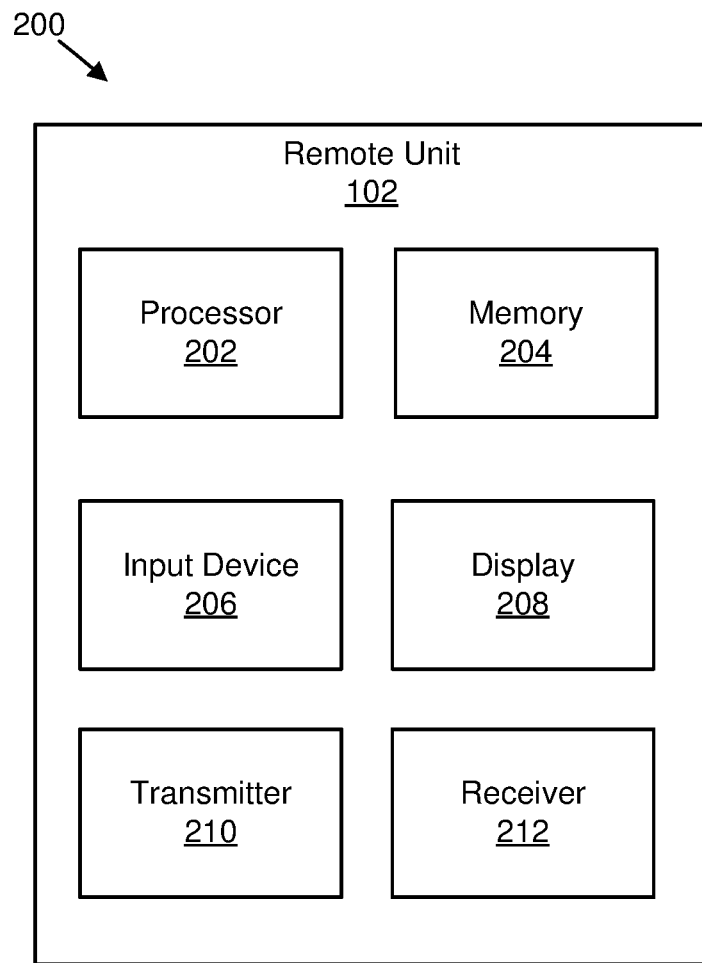
FIG. 2 is a schematic block diagram illustrating one embodiment of an apparatus that may be used for receiving configuration information for an inactive state.

FIG. 2 depicts one embodiment of an apparatus 200 that may be used for receiving configuration information for an inactive state. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 transitions a radio bearer to an inactive state after receiving configuration information. In certain embodiments, the processor 202 configures the radio bearer based on the configuration information in response to transitioning the radio bearer to the inactive state. In some embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to configuration information. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 receives configuration information for a radio bearer. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
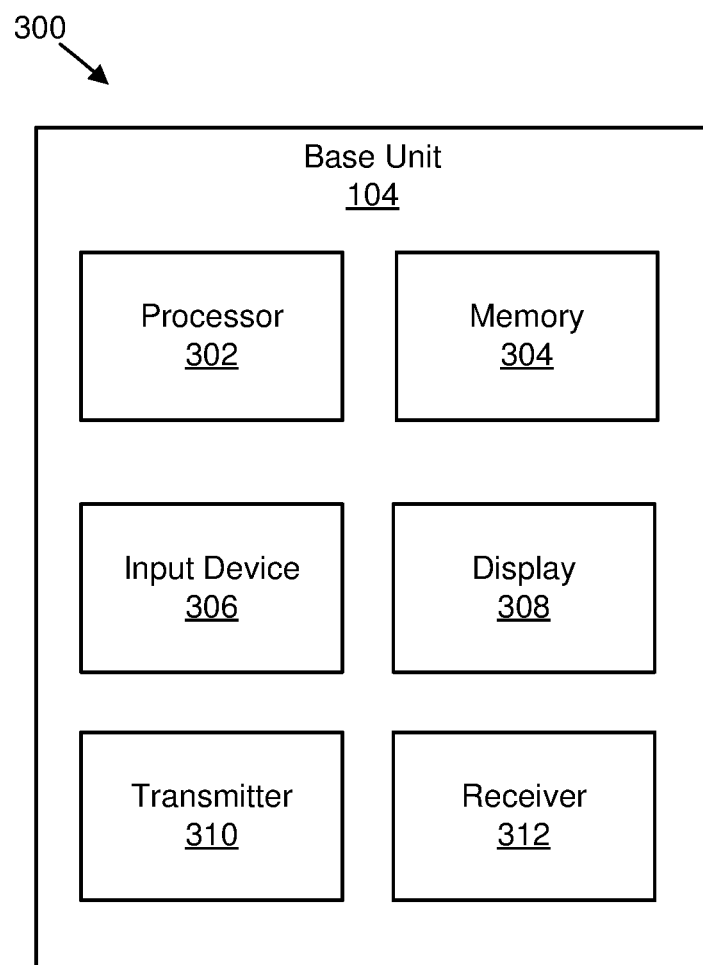
FIG. 3 is a schematic block diagram illustrating one embodiment of an apparatus that may be used for transmitting configuration information for an inactive state.

FIG. 3 depicts one embodiment of an apparatus 300 that may be used for transmitting configuration information for an inactive state. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the processor 202 is used to determine configuration information for a radio bearer of a remote unit 102. In various embodiments, the transmitter 310 is used to transmit the configuration information to the remote unit 102. In certain embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

FIGS. 4 through 14 illustrate various embodiments that may be used in conjunction with a remote unit 102 in an inactive state. In certain embodiments, a remote unit 102 may be moved to an RRC inactive state from an RRC connected state, the remote unit 102 may make an initial/first data transfer in the inactive state (e.g., including a remote unit 102 identification and/or a new data indication); a base unit 104 may decide based on the new data indication whether the remote unit 102 should remain in the inactive state, be given larger grants (e.g., for a remote unit 102 in a good radio), and/or initiate transition of the remote unit 102 back to the connected state, and/or the remote unit 102 may operate based on the decision of the base unit 104 (e.g., by making a transition to the connected state, transmitting larger data sizes in the inactive state, sending a buffer status report, etc.). As used herein, an "RRC inactive state" or an "inactive state" may refer to a state of a remote unit 102 in which a radio of the remote unit 102 is active from time to time for performing measurements, making small UL transmissions but in this state the remote unit 102 does not send measurement reports to the base unit 104, and the remote unit 102 is known to at least an "anchor" base unit 104, an "RRC connected state" or a "connected state" may refer to a state of a remote unit 102 in which a radio of the remote unit 102 is active and sends measurements report to the base unit 104 and the remote unit 102 is known to the base unit 104. Furthermore, as used herein, an "anchor" base unit 104 may refer to a base unit 104 that has sent a remote unit 102 to an inactive state. After sending the remote unit 102 to the inactive state, the remote unit 102 may move to a new base unit 104, but the new base unit 104 may not know about the presence of the remote unit 102 until the remote unit 102 starts an UL transmission relating to the new base unit 104.

In some embodiments, a base unit 104 may move a remote unit 102 from a connected state to an inactive state. In such embodiments, data radio bearers ("DRBs") that are configured in a connected state may be continued or suspended upon the remote unit 102 transition to the inactive state. In various embodiments, for bearers that the base unit 104 intends to keep, the base unit 104 may explicitly tell the remote unit 102 about which DRBs are enabled to initiate data transmission (e.g., in UL) and which DRB(s) should have a different behavior. In one embodiment, a first option includes indicating to the remote unit 102 that particular DRBs may continue data transmission in UL in the inactive state if a data size is less than a predetermined threshold. In another embodiment, a second option includes indicating to the remote unit 102 that particular DRBs may initiate connection activation in response to data arriving in L2 before initiating data transmission in UL (e.g., initiate a transition from the inactive state to the connected state, initiate a resume of the connected state). In a further embodiment, a third option includes indicating to the remote unit 102 that particular DRBs may initiate data transmission in UL and subsequently initiate transition connection activation (e.g., data is transmitted first followed by a message, e.g., in a subsequent UL transmission, to initiate a transition from the inactive state to the connected state or a resume of the connected state). In various embodiments, both the data and message to initiate (e.g., trigger) transition from the inactive state to the connected state may be transmitted together based on available resources. In certain embodiments, a fourth option includes indicating to the remote unit 102 that particular DRBs may not be enabled (e.g., inhibited) to initiate data transmission and/or may not be enabled to trigger transition to the connected state. Such DRBs may be considered in a suspended state and may be activated upon the remote unit 102 transitioning to the connected state.

In one embodiment, a remote unit 102 may be informed of DRB configuration by the base unit 104 transmitting 2 bits (e.g., one for each of the 4 options described above) per DRB and/or signaling radio bearer ("SRB"). In another embodiment, only one bit per DRB and/or SRB may be used for indicating any 2 of the above 4 options (e.g., options 1 and 2 may be indicated or options 1 and 3 may be indicated). Based on one or two bit indication, the remote unit 102 may initiate data transmission and/or transition to the connected state while data arrives in the remote unit 102 layer 2 buffer in the inactive state. Various embodiments that use the four options described above are further described in relation to FIGS. 4 and 5.

In some embodiments, a remote unit 102 may make an UL transmission (e.g., data and/or a remote unit identification) if the data is less than a predetermined threshold. The UL transmission may be referred to herein as "Msg1." In various embodiments, Msg1 may include a new indication. In certain embodiments, the remote unit 102 may make the UL transmission in a contention based manner in which the remote unit 102 selects a set of resources (e.g., from resources configured for this purpose by the base unit 104 such as in a broadcast message) adequate to send the remote unit 102 data and transmits the data on the selected resources. In one embodiment, the resources used to transmit data may be based on an estimation of the remote unit's radio link quality (e.g., based on a pathloss/a reference signal received power ("RSRP") calculation on some of the primary synchronization signal ("PSS"), secondary synchronization signal ("SSS"), and/or reference signals). In certain embodiments, modulation and coding scheme ("MCS") and/or transport block ("TB") sizes may be derived from a remote unit 102 estimation of its own radio quality. In various embodiments, resource selection may be done randomly by a base unit 104 among configured resources. In some embodiments, an enhancement RSRP-range may be used to stagger and/or distribute configured resources.

In one embodiment, a remote unit 102 is enabled to send data in an inactive state only if a data size in a layer-2 buffer is less than or equal to a predetermined data threshold. In certain embodiments, a decision and/or comparison about the data size in a layer-2 buffer may be performed at: a packet data convergence protocol ("PDCP") before or after adding its header and message authentication code integrity ("MAC-I"); a radio link control ("RLC") before or after adding its header; or medium access control ("MAC") before or after it constructs a MAC TB. In various embodiments, both PDCP and RLC entities may be bearer specific. In such embodiments, it may be difficult to calculate a per remote unit 102 buffer occupancy at PDCP or RLC. Therefore, in such embodiments, the MAC may calculate the buffer occupancy ("BO"). In certain embodiments, the BO may be affected only by bearers that are not considered suspended and are allowed to transmit data while in the inactive state. For this reason, in such embodiments, the base unit 104 may explicitly indicate which bearers are considered for BO calculation and which are not. In some embodiments, the bearers considered for BO calculation may depend on whether a corresponding logical channel belongs to a logical channel group ("LCG").

In certain embodiments, the new indication of Msg1 may be an indication about whether "subsequent data" is expected to be available (e.g., based on application, non-access stratum, and/or access stratum interaction). This future BO may be larger than or less than the predetermined data threshold. As used herein, "subsequent data" may refer to data that may be available in the application layer but is not yet submitted/visible in the layer-2 buffer. In one embodiment, for a first transfer, the predetermined data threshold may be used to determine whether the remote unit 102 should stay in the inactive state and send the data or whether the remote unit 102 should transition to the connected state. In some embodiments, because CSI reports are not available from a remote unit 102 that is in an inactive state (e.g., the remote unit 102 might be in a different cell than where the remote unit 102 was last sent to inactive state due to mobility), there may be a limited size of data/resources that are desired to be sent blindly. In various embodiments, a base unit 104 may have information that facilitates enabling larger grants while a remote unit 102 is in the inactive state (e.g., based on HARQ decoding efforts, uplink timing etc.). In one embodiment, the base unit 104 may reconfigure the predetermined threshold using RRC or MAC (e.g., MAC control element ("CE")) signaling. In another embodiment, the base unit 104 may use a PDCCH-grant based approach to allocate grants even to a remote unit 102 in the inactive state.

In various embodiments, based on the new indication of Msg1, the base unit 104 may trigger the remote unit 102 to return to the connected state (e.g., using a DL RRC or MAC signaling). In certain embodiments, the base unit 104 may make different decision for different remote units 102. For example, the base unit 104 may transmit instructions for the remote unit 102 to perform: initiating transition to the connected state; initiating UL synchronization (e.g., based on a TA provided to the remote unit 102); processing an UL grant (e.g., the UL grant may be provided on a PDCCH-like channel); transmitting data; and/or transmitting a BSR (e.g., as part of the next UL transmission).

In some embodiments, the new indication of Msg1 may be indicated by one bit. In such embodiments, the new indication may indicate to the base unit 104 that: subsequent data is available and the subsequent data is less than the predetermined data threshold; or subsequent data is available and the subsequent data is larger than the predetermined data threshold. Various embodiments of the new indication are further described in relation to FIGS. 6 and 8.

In various embodiments, the one bit indication may be indicated to the base unit 104 may including the indication in one of the following ways: as a new MAC CE having its own specified logical channel identification; as part of MAC protocol data unit ("PDU") header format for remote units 102 in the inactive state (e.g., one bit may be reserved in the MAC PDU for the indication); or as an extension of a remote unit 102 identification (e.g., this may be done at RRC in which the RRC appends (or prepends) one bit, for example, a 40 bit resume ID in 3GPP becomes 41 bits).

In certain embodiments, based on information from a remote unit 102, such as one bit information described herein, a base unit 104 may determine to provide a dedicated grant to the remote unit 102. In various embodiments, upon receiving data and/or a remote unit 102 identification, the base unit 104 may determine to provide a dedicated grant to the remote unit 102. In one embodiment, the dedicated grant may address a prior cell radio network temporary identifier ("C-RNTI") (e.g., corresponding to the remote unit 102 stored context) in a DL response message acknowledging the remote unit 102 data reception as well as potentially carrying a timing alignment ("TA") value. In another embodiment, the dedicated grant may allocate a new RNTI (e.g., on a random access radio network temporary identifier, "RA_RNTI" corresponding to the chosen resources such as PRACH or non-PRACH resources used by the remote unit 102 to transmit data and/or an identification) in a DL response message acknowledging the remote unit 102 data reception as well as potentially carrying a TA value. The remote unit 102 may then use the received RNTI as C-RNTI and the C-RNTI may be used to provide DL scheduling and UL grants in future communication if there is more data to be sent and/or received. In various embodiments, the remote unit 102 may apply the TA if present and/or may process the grant. In certain embodiments, if the grant is larger than the BO, the remote unit 102 may transmit UL data; otherwise, the remote unit 102 may include a buffer status report ("BSR") and/or may transmit part of the data in the remaining portion of the grant. One embodiment that illustrates a base unit 104 transmitting a DL response message to a remote unit 102 is described in relation to FIG. 9.

In some embodiments, in the DL response message to the remote unit 102 (e.g., with or without a grant and/or TA), the base unit 104 may include an indication for the remote unit 102 to initiate transition to a connected state (or to resume the connected state). In various embodiments, during a logical channel prioritization ("LCP"), the remote unit 102 may prioritize transmission according to the following rules: an RRC message initiating transition/resume to the connected state has a highest priority; a BSR has a next highest priority unless outstanding data to be transmitted can be completely accommodated in the grant (e.g., a portion of the grant remaining after the RRC message inclusion); and outstanding data to be transmitted has a lowest priority. In certain embodiments, the priority for LCP may be signaled by the base unit 104 in the DL response message. Various embodiments of LCP are further described in relation to FIGS. 10 through 12.

In various embodiments, if a remote unit 102 has data available frequently and the amount of data is lower than a predefined data threshold, the remote unit 102 may transition to the connected state and perform data transmissions in the connected state. In certain embodiments, the base unit 104 may initiate transition of the remote unit 102 to the connected state at any point in time. In some embodiments, the base unit 104 may configure a number "N" and a time period "T" such that if the remote unit 102 makes N or more transmission within the time period T, then the remote unit 102 may trigger the transition to the connected state on its own without receiving explicit initiation information from the base unit 104. In one embodiment, the "N" may also be an "amount of data" threshold (e.g., 1,000 bytes, etc.). In such an embodiment, if the remote unit 102 transmits more than 1,000 bytes in time period T, then the remote unit 102 may subsequently trigger a transition to the connected state on its own. Various embodiments of a trigger condition are further described in relation to FIGS. 13 and 14.

Figure 4:
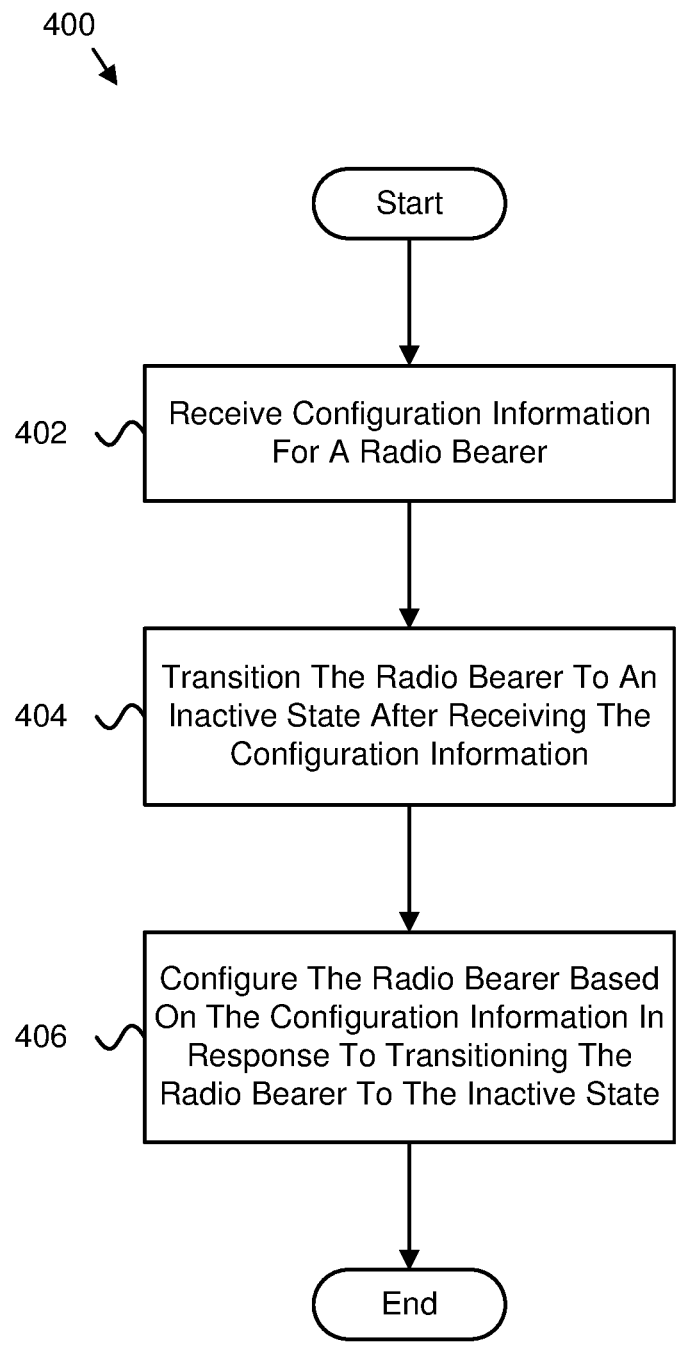
FIG. 4 is a schematic flow chart diagram illustrating one embodiment of a method for receiving configuration information for an inactive state.

FIG. 4 is a schematic flow chart diagram illustrating one embodiment of a method 400 for receiving configuration information for an inactive state. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 configuration information for a radio bearer. In various embodiments, the method 400 includes transitioning 404 the radio bearer to an inactive state after receiving the configuration information. In certain embodiments, the method 400 includes configuring 406 the radio bearer based on the configuration information in response to transitioning the radio bearer to the inactive state. In some embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state.

In one embodiment, the data property includes a data size, a buffer occupancy level, or some combination thereof. In a further embodiment, receiving 402 the configuration information includes receiving the configuration information with a message directing the radio bearer to transition to the inactive state.

Figure 5:
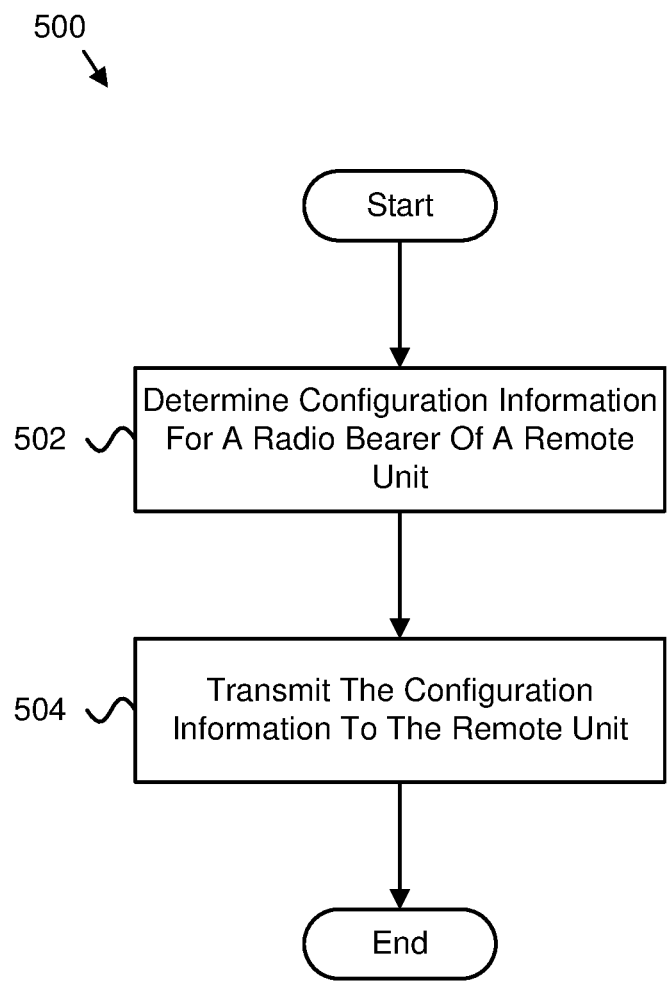
FIG. 5 is a schematic flow chart diagram illustrating one embodiment of a method for transmitting configuration information for an inactive state.

FIG. 5 is a schematic flow chart diagram illustrating one embodiment of a method 500 for transmitting configuration information for an inactive state. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 configuration information for a radio bearer of a remote unit 102. In various embodiments, the method 500 includes transmitting 504 the configuration information to the remote unit 102. In certain embodiments, the configuration information configures the radio bearer with a configuration selected from the group including: a first configuration that transmits data in the inactive state in response to a data property being less than a predetermined threshold; a second configuration that initiates transition from the inactive state to a connected state before transmitting data; a third configuration that transmits data in the inactive state and initiates transition from the inactive state to the connected state after at least a portion of the data is transmitted; and a fourth configuration that inhibits data transmission in the inactive state and inhibits initiating transition from the inactive state to the connected state.

Figure 6:
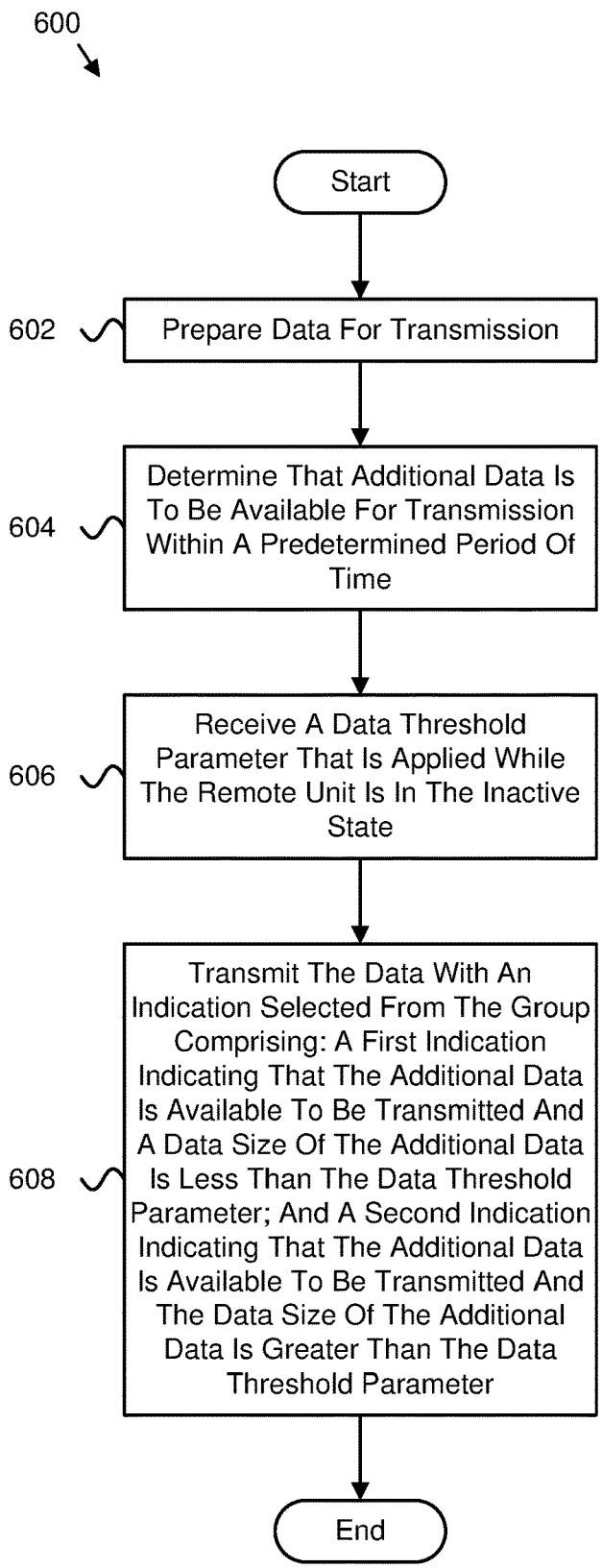
FIG. 6 is a schematic flow chart diagram illustrating one embodiment of a method for transmitting an indication about additional data.

FIG. 6 is a schematic flow chart diagram illustrating one embodiment of a method 600 for transmitting an indication about additional data. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include preparing 602 data for transmission. The method 600 also includes determining 604 that additional data is to be available for transmission within a predetermined period of time. The method 600 includes receiving 606 a data threshold parameter that is applied while a remote unit 102 is in an inactive state. The method 600 also includes transmitting 608 the data with an indication selected from the group including: a first indication indicating that the additional data is available to be transmitted and a data size of the additional data is less than the data threshold parameter; and a second indication indicating that the additional data is available to be transmitted and the data size of the additional data is greater than the data threshold parameter.

In one embodiment, the method 600 includes determining anticipated data unavailable in a layer 2 transmission buffer based on interaction between layer 2 access stratum protocols, non-access stratum, an application layer, layers higher than layer 2, or some combination thereof. In various embodiments, the method 600 includes comparing a buffer occupancy of the anticipated data with the data threshold parameter. In certain embodiments, the indication includes information indicating a result of the comparison between the buffer occupancy of the anticipated data and the data threshold parameter. In some embodiments, the information includes a one bit flag having a status selected from the group including: a first status indicating that a size of the anticipated data is greater than the data threshold parameter; and a second status indicating that the size of the anticipated data is less than the data threshold parameter. In one embodiment, the indication is transmitted using a resource selected from the group including: a medium access control element having its own logical channel identification; a medium access control protocol data unit header format; and a remote unit identification.

In various embodiments, the remote unit 102 includes state indication information that indicates whether the remote unit 102 is in the inactive state or a connected state. In certain embodiments, the method includes transmitting the state indication information using a resource selected from the group including: a medium access control element having its own logical channel identification; a medium access control protocol data unit header format; a transport channel and/or a physical channel; predetermined physical resources for transmitting while in the inactive state; a predetermined format for transmitting while in the inactive state; and a predetermined preamble for transmitting while in the inactive state.

Figure 7:
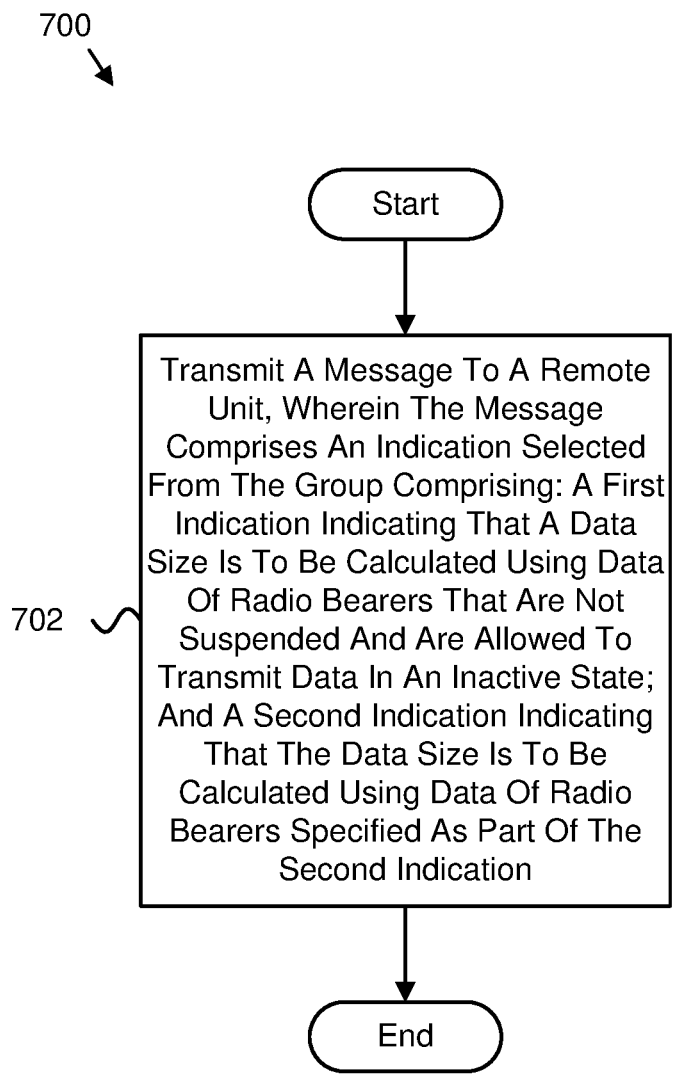
FIG. 7 is a schematic flow chart diagram illustrating one embodiment of a method for configuring a remote unit in an inactive mode.

FIG. 7 is a schematic flow chart diagram illustrating one embodiment of a method 700 for configuring a remote unit 102 in an inactive mode. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a message to a remote unit 102. In such embodiments, the message may include an indication selected from the group including: a first indication indicating that a data size is to be calculated using data of radio bearers that are not suspended and are allowed to transmit data in an inactive state; and a second indication indicating that the data size is to be calculated using data of radio bearers specified as part of the second indication. In one embodiment, the message is transmitted using a resource selected from the group including: radio resource control signaling; and lower layer signaling.

Figure 8:
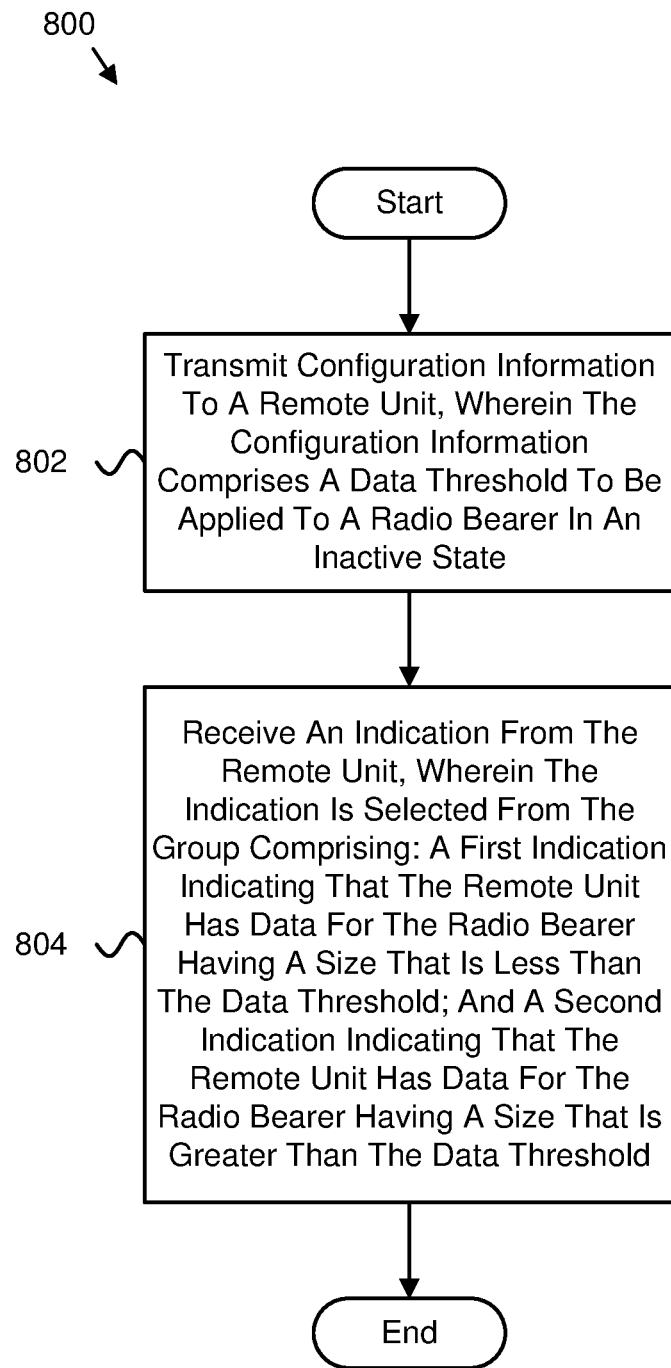
FIG. 8 is a schematic flow chart diagram illustrating another embodiment of a method for transmitting configuration information for an inactive state.

FIG. 8 is a schematic flow chart diagram illustrating another embodiment of a method 800 for transmitting configuration information for an inactive state. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 configuration information to a remote unit 102. In such embodiments, the configuration information may include a data threshold to be applied to a radio bearer in an inactive state. The method 800 also includes receiving 804 an indication from the remote unit 102. In various embodiments, the indication is selected from the group including: a first indication indicating that the remote unit 102 has data for the radio bearer having a size that is less than the data threshold; and a second indication indicating that the remote unit 102 has data for the radio bearer having a size that is greater than the data threshold.

In various embodiments, the method 800 includes transmitting a message to the remote unit 102, the message including instructions for the remote unit to perform: initiating uplink synchronization based on a timing alignment if the timing alignment is included in the message; processing an uplink grant if the uplink grant is included in the message; transmitting data; transmitting a buffer status report; transmitting information initiating transition to a connected state; or some combination thereof. In some embodiments, the message is transmitted using a resource selected from the group including: radio resource control signaling; a lower layer medium access control element; and physical layer signaling.

Figure 9:
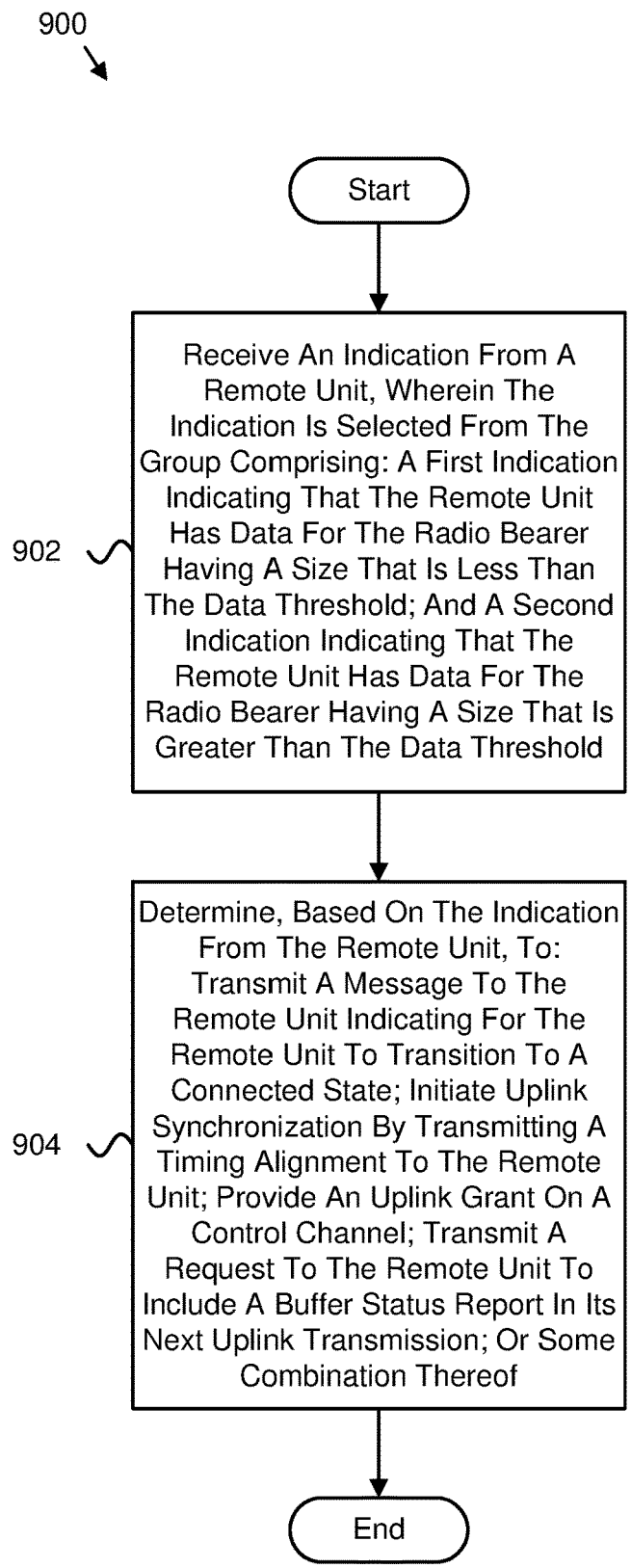
FIG. 9 is a schematic flow chart diagram illustrating one embodiment of a method for determining a response to an indication from a remote unit.

FIG. 9 is a schematic flow chart diagram illustrating one embodiment of a method 900 for determining a response to an indication from a remote unit 102. In some embodiments, the method 900 is performed by an apparatus, such as the base unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 an indication from a remote unit 102. In various embodiments, the indication is selected from the group including: a first indication indicating that the remote unit 102 has data for the radio bearer having a size that is less than the data threshold; and a second indication indicating that the remote unit 102 has data for the radio bearer having a size that is greater than the data threshold. The method 900 also includes determining 902, based on the indication from the remote unit 102, to: transmit a message to the remote unit 102 indicating for the remote unit 102 to transition to a connected state; initiate uplink synchronization by transmitting a timing alignment to the remote unit 102; provide an uplink grant on a control channel; transmit a request to the remote unit 102 to include a buffer status report in its next uplink transmission; or some combination thereof. In certain embodiments, the message is transmitted using a radio resource control signaling or lower layer signaling.

Figure 10:
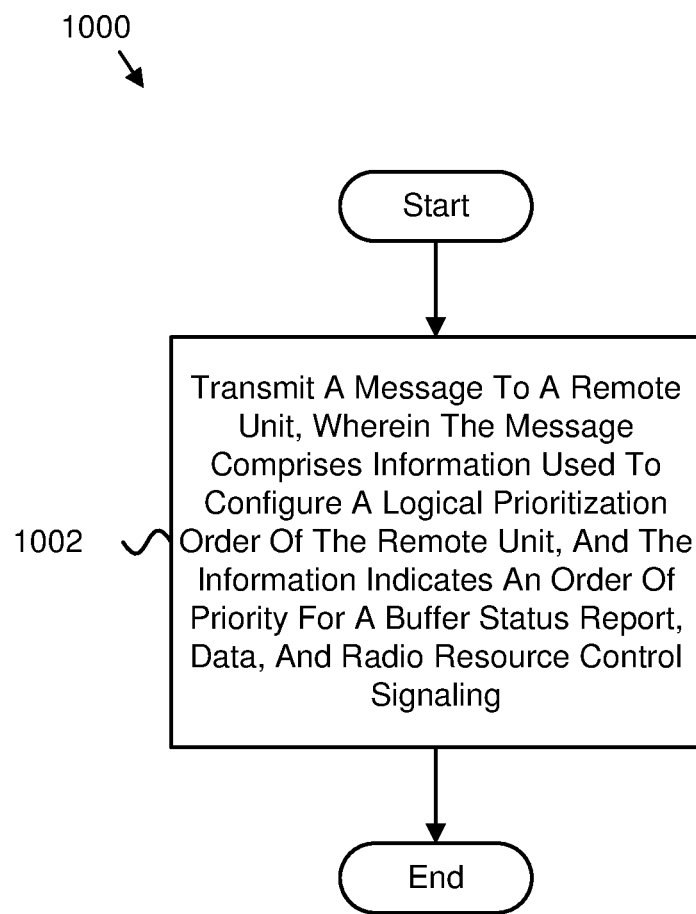
FIG. 10 is a schematic flow chart diagram illustrating one embodiment of a method for transmitting information for configuring a logical prioritization order.

FIG. 10 is a schematic flow chart diagram illustrating one embodiment of a method 1000 for transmitting information for configuring a logical prioritization order. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a message to a remote unit 102. In some embodiments, the message includes information used to configure a logical prioritization order of the remote unit 102, and the information indicates an order of priority for a buffer status report, data, and radio resource control signaling. In some embodiments, the message is transmitted using a resource selected from the group including: radio resource control signaling; a lower layer medium access control element; and physical layer signaling.

Figure 11:
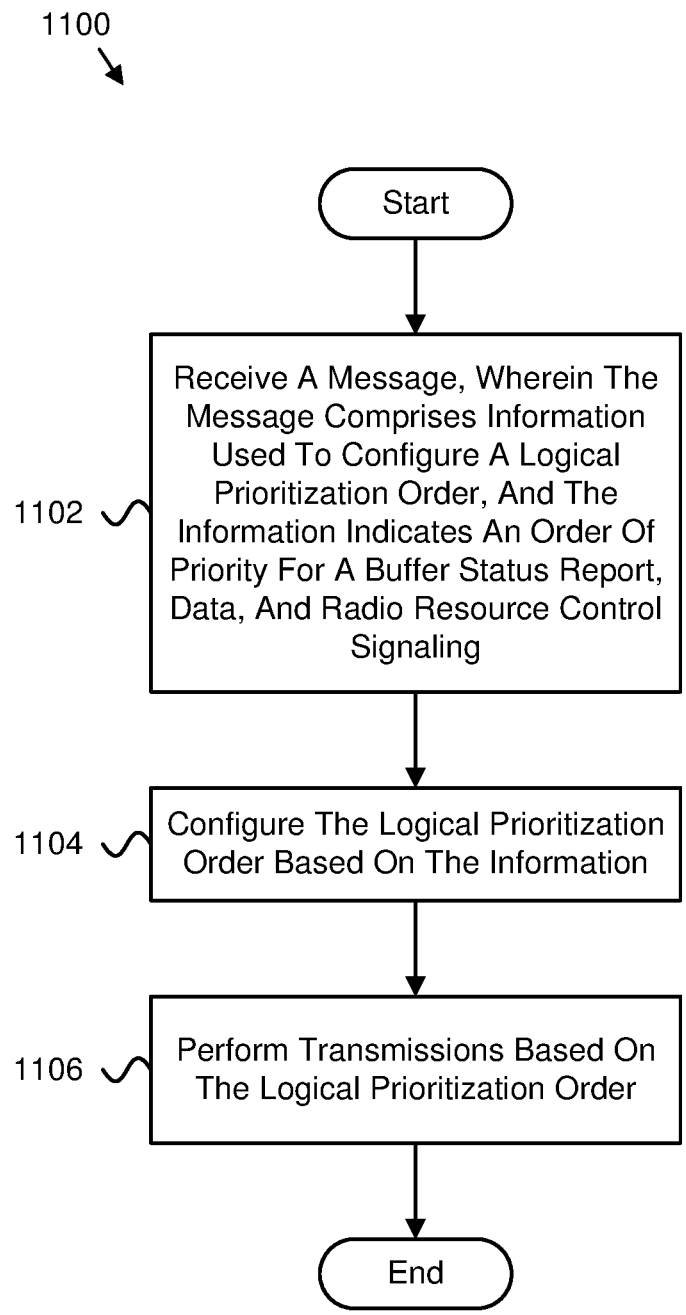
FIG. 11 is a schematic flow chart diagram illustrating one embodiment of a method for receiving information for configuring a logical prioritization order.

FIG. 11 is a schematic flow chart diagram illustrating one embodiment of a method 1100 for receiving information for configuring a logical prioritization order. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 a message. In certain embodiments, the message includes information used to configure a logical prioritization order, and the information indicates an order of priority for a buffer status report, data, and radio resource control signaling. The method 1100 also includes configuring 1104 the logical prioritization order based on the information. The method 1100 includes performing 1106 transmissions based on the logical prioritization order.

Figure 12:
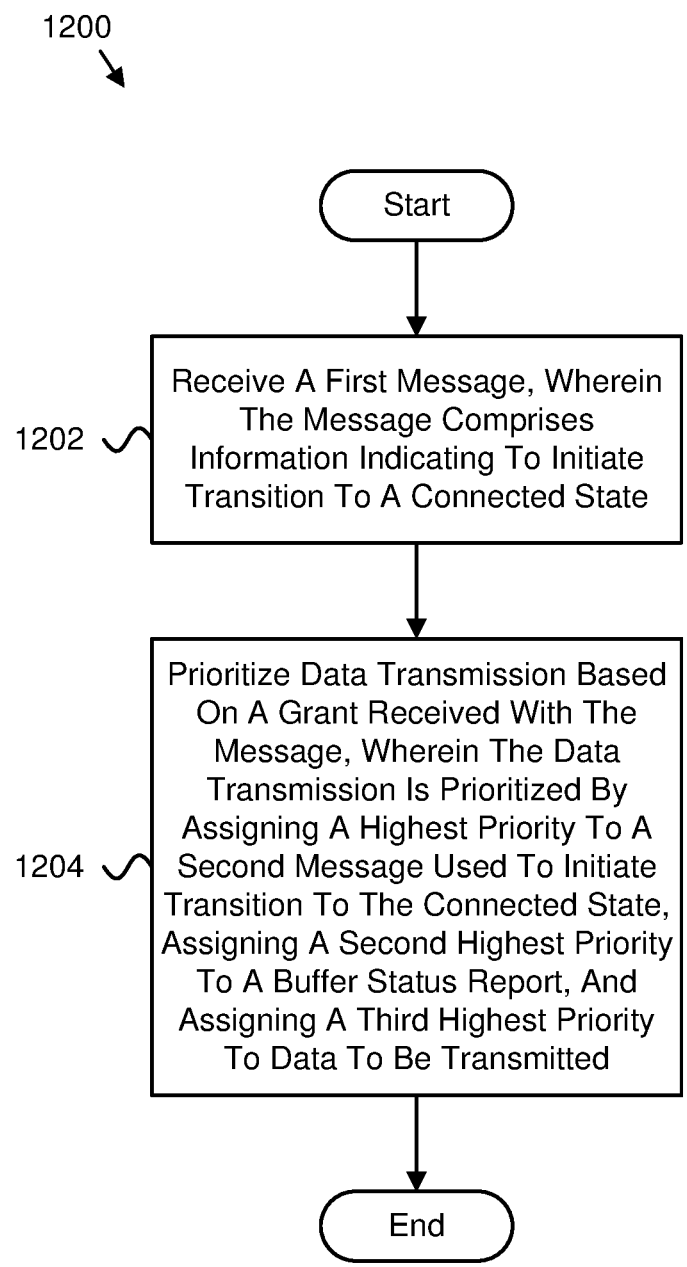
FIG. 12 is a schematic flow chart diagram illustrating one embodiment of a method for prioritizing data.

FIG. 12 is a schematic flow chart diagram illustrating one embodiment of a method 1200 for prioritizing data. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 a first message. In various embodiments, the first message includes information indicating to initiate transition to a connected state. The method 1200 also includes prioritizing 1204 data transmission based on a grant received with the first message. In some embodiments, the data transmission is prioritized by assigning a highest priority to a second message used to initiate transition to the connected state, assigning a second highest priority to a buffer status report, and assigning a third highest priority to data to be transmitted. In some embodiments, the data is transmitted with the second message in response to there being sufficient space as part of the grant.

Figure 13:
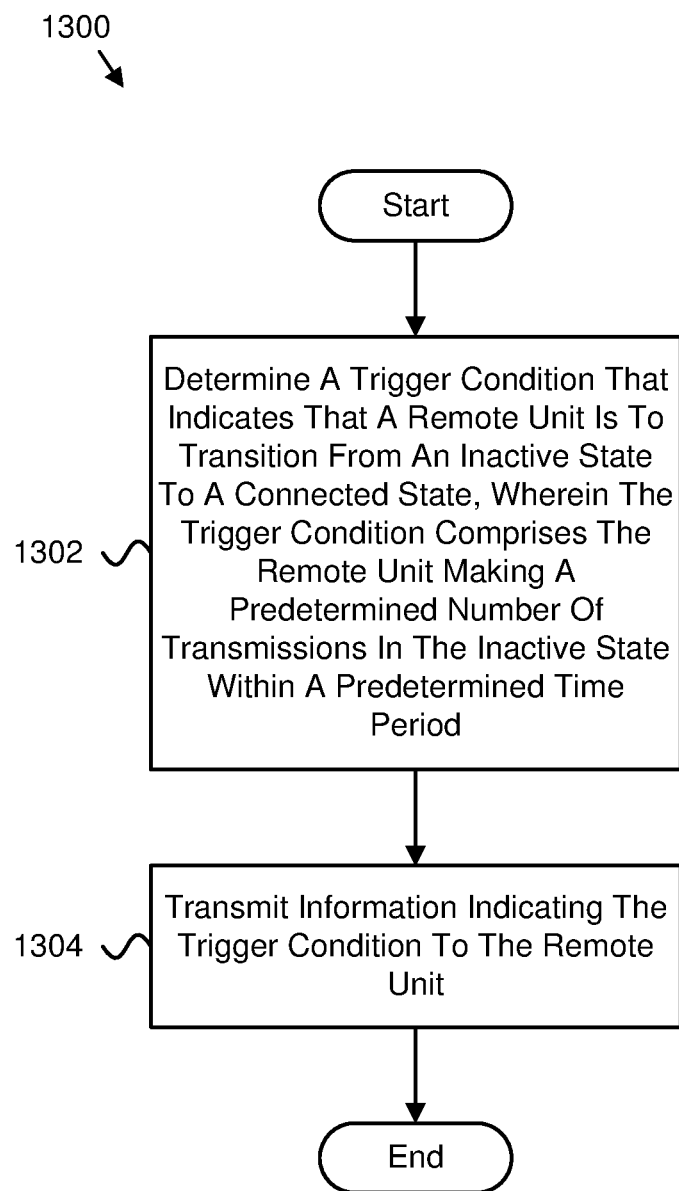
FIG. 13 is a schematic flow chart diagram illustrating one embodiment of a method for transmitting information indicating a trigger condition.

FIG. 13 is a schematic flow chart diagram illustrating one embodiment of a method 1300 for transmitting information indicating a trigger condition. In some embodiments, the method 1300 is performed by an apparatus, such as the base unit 104. In certain embodiments, the method 1300 may be performed by a processor executing program code, for example, a microcontroller, a microprocessor, a CPU, a GPU, an auxiliary processing unit, a FPGA, or the like.

The method 1300 may include determining 1302 a trigger condition that indicates that a remote unit 102 is to transition from an inactive state to a connected state. In certain embodiments, the trigger condition includes the remote unit 102 making a predetermined number of transmissions in the inactive state within a predetermined time period. The method 1300 also includes transmitting 1304 information indicating the trigger condition to the remote unit 102. In some embodiments, the predetermined number of transmissions includes an amount of data greater than a predetermined threshold.

Figure 14:
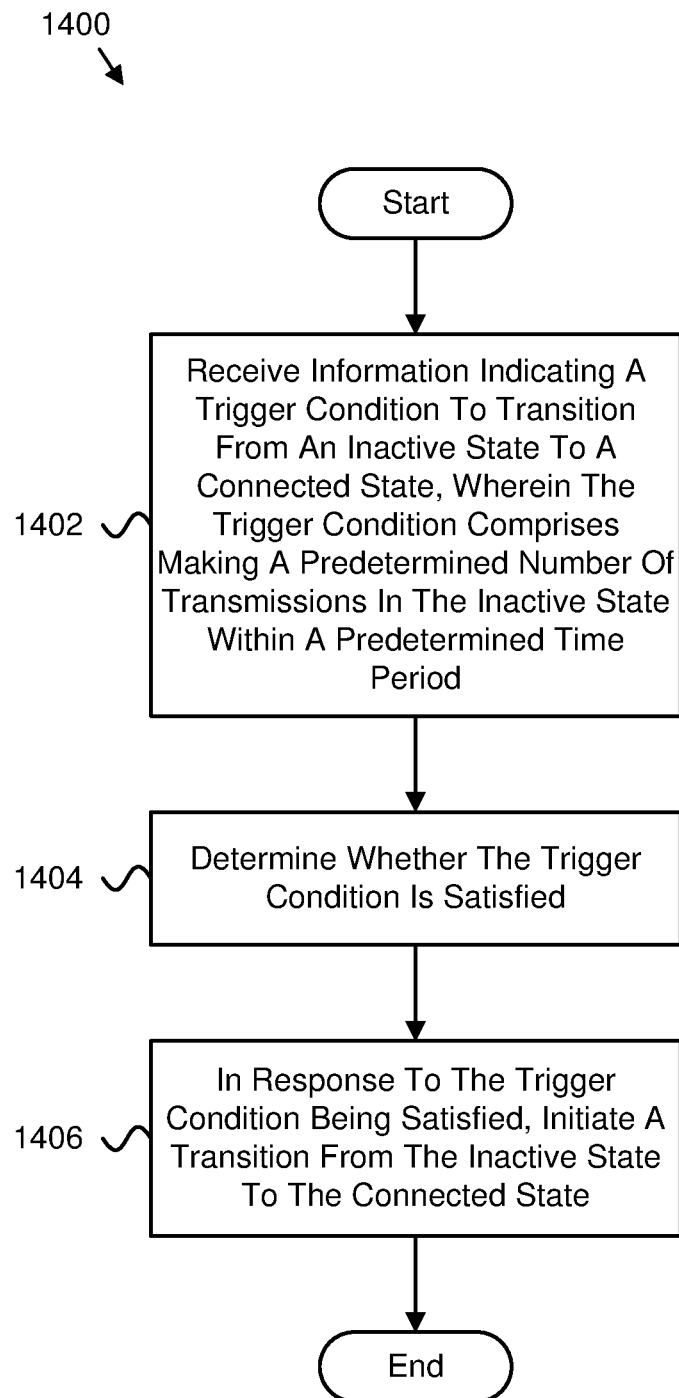
FIG. 14 is a schematic flow chart diagram illustrating one embodiment of a method for receiving information indicating a trigger condition.

FIG. 14 is a schematic flow chart diagram illustrating one embodiment of a method 1400 for receiving information indicating a trigger condition. In some embodiments, the method 1400 is performed by an apparatus, such as the remote unit 102. In certain embodiments, the method 1400 may be performed by a processor executing program code, for example, a microcontroller, a microprocessor, a CPU, a GPU, an auxiliary processing unit, a FPGA, or the like.

The method 1400 may include receiving 1402 information indicating a trigger condition to transition from an inactive state to a connected state. In some embodiments, the trigger condition includes making a predetermined number of transmissions in the inactive state within a predetermined time period. The method 1400 also includes determining 1404 whether the trigger condition is satisfied. The method 1400 includes, in response to the trigger condition being satisfied, initiating 1406 a transition from the inactive state to the connected state. In one embodiment, initiating the transition from the inactive state to the connected state includes using a resume procedure.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving configuration information for a radio bearer, wherein the configuration information comprises a first configuration, a second configuration, and a third configuration;
   transitioning the radio bearer to an inactive state after receiving the configuration information; and
   configuring the radio bearer based on the configuration information in response to transitioning the radio bearer to the inactive state, wherein the configuration information configures the radio bearer with a configuration selected from the group comprising:
      the first configuration that transmits data in the inactive state in response to a data property being less than a predetermined threshold;
      the second configuration that transmits data in the inactive state and initiates transition from the inactive state to the connected state after at least a portion of the data is transmitted; and
      the third configuration that inhibits data transmission in the inactive state and inhibits initiating transition from the inactive state to the connected state.

2. The method of claim 1, wherein the data property comprises a data size, a buffer occupancy level, or some combination thereof.

3. The method of claim 1, wherein receiving the configuration information comprises receiving the configuration information with a message directing the radio bearer to transition to the inactive state.

4. An apparatus comprising:
   a processor that determines configuration information for a radio bearer of a remote unit, wherein the configuration information comprises a first configuration, a second configuration, and a third configuration; and
   a transmitter that transmits the configuration information to the remote unit, wherein the configuration information configures the radio bearer with a configuration selected from the group comprising:
      the first configuration that transmits data in an inactive state in response to a data property being less than a predetermined threshold;
      the second configuration that transmits data in the inactive state and initiates transition from the inactive state to the connected state after at least a portion of the data is transmitted; and
      the third configuration that inhibits data transmission in the inactive state and inhibits initiating transition from the inactive state to the connected state.

5. The apparatus of claim 4, wherein the transmitter is further configured to:
   transmit a message to the remote unit, wherein the message comprises an indication selected from the group comprising:
      a first indication indicating that a data size is to be calculated using data of radio bearers that are not suspended and are allowed to transmit data in an inactive state; and
      a second indication indicating that the data size is to be calculated using data of radio bearers specified as part of the second indication.

6. The apparatus of claim 5, wherein the message is transmitted using a resource selected from the group comprising:
   radio resource control signaling; and
   lower layer signaling.

7. The apparatus of claim 4, wherein the configuration information comprises a data threshold to be applied to a radio bearer in an inactive state, and the apparatus includes a receiver that receives an indication from the remote unit, wherein the indication is selected from the group comprising:
   a first indication indicating that the remote unit has data for the radio bearer having a size that is less than the data threshold; and
   a second indication indicating that the remote unit has data for the radio bearer having a size that is greater than the data threshold.

8. The apparatus of claim 7, wherein the transmitter is further configured to transmit a message to the remote unit, the message comprising instructions for the remote unit to perform:
   initiating uplink synchronization based on a timing alignment if the timing alignment is included in the message;
   processing an uplink grant if the uplink grant is included in the message;
   transmitting data;
   transmitting a buffer status report;
   transmitting information initiating transition to a connected state; or
   some combination thereof.

9. The apparatus of claim 8, wherein the message is transmitted using a resource selected from the group comprising:
   radio resource control signaling;
   a lower layer medium access control element; and
   physical layer signaling.

10. The apparatus of claim 4, wherein the transmitter is further configured to transmit a message to the remote unit, wherein the message comprises information used to configure a logical prioritization order of the remote unit, and the information indicates an order of priority for a buffer status report, data, and radio resource control signaling.

11. The apparatus of claim 10, wherein the message is transmitted using a resource selected from the group comprising:
   radio resource control signaling;
   a lower layer medium access control element; and
   physical layer signaling.

* * * * *